United States Patent [19]

Cotton

[11] 4,327,443

[45] Apr. 27, 1982

[54] CAPILLARY LIQUID FUEL NUCLEAR REACTOR

[76] Inventor: Donald J. Cotton, 1101 3rd Street, S.W., Washington, D.C. 20024

[21] Appl. No.: 112,739

[22] Filed: Jan. 17, 1980

Related U.S. Application Data

[63] Continuation-in-part of Ser. No. 912,731, Jun. 5, 1978, abandoned.

[51] Int. Cl.³ .............................................. G21C 3/44
[52] U.S. Cl. ................................... 376/359; 376/347; 376/409
[58] Field of Search ..................... 176/46–49, 176/50, 61, 51, 67, 86 L

[56] References Cited

U.S. PATENT DOCUMENTS

| | | | |
|---|---|---|---|
| 2,990,354 | 6/1961 | Anderson et al. | 176/46 |
| 3,034,978 | 5/1962 | Rodin et al. | 176/49 |
| 3,070,529 | 12/1962 | Wigner | 176/46 |
| 3,216,901 | 11/1965 | Teitel | 176/49 |
| 3,486,977 | 12/1969 | Geist | 176/47 |
| 3,525,670 | 8/1970 | Brown | 176/86 L |
| 4,040,932 | 8/1977 | Cotton | 204/219 |

Primary Examiner—Harvey E. Behrend

[57] ABSTRACT

Capillary liquid fuel elements, created by the method of confining a liquid fuel in horizontal capillary troughs, are employed to create the core of a nuclear reactor to generate useful heat energy. The reactor incorporates the inherent advantages of a liquid fuel reactor: high specific power, high fuel burnup, inherent safety, ease of control, and simple fuel preparation, processing, reprocessing, and handling. The reactor in addition, has advantages unavailable in other liquid fuel reactors: high breeding potential, low delayed neutron loss, low pumping power requirement, low fission material external holdup, direct fuel-coolant heat exchange capability, and low construction material cost.

4 Claims, 3 Drawing Figures

CAPILLARY LIQUID FUEL NUCLEAR REACTOR

This is a continuation-in-part (as to all common matter) of application Ser. No. 912,731 filed on June 5, 1978, now abandoned.

This invention involves the unobvious utilization of a method first disclosed in application Ser. No. 626,308, filed Oct. 28, 1975. In this disclosure, a liquid fuel is defined as a homogeneous liquid which contains a fissile substance, i.e., a substance capable of undergoing and sustaining a nuclear fission chain reaction; a capillary fuel element is a horizontal capillary trough filled with liquid fuel; a capillary trough is a section of a hollow capillary tube bisected parallel to its longitudinal (long) axis by a plane that forms the longitudinal plane surface and bounds the longitudinal opening of the section; a horizontal capillary trough is so oriented that its longitudinal plane surface is approximately horizontal, and its longitudinal opening is located at its top. Liquid fuel capillary constant equals the square root of two times the liquid fuel interfacial tension divided by the product of the earth's gravitational constant (980.1 centimeters per second per second) and the difference in the densities of the liquid fuel and its surrounding medium.

This invention relates to the novel employment of capillary fuel elements to create a nuclear reactor that utilizes liquid fuel, particularly an internally cooled, heterogeneous reactor that uses a liquid metal or molten salt solution of uranium or of plutonium as fuel. The use of the present invention in other types of reactors is also contemplated, e.g., in breeder reactors, in externally cooled liquid fuel reactors, and in reactors that utilize aqueous or molten salt solutions of uranium or of plutonium as fuel.

General advantages of a liquid fuel system over solid fuel systems are high specific power, high fuel burnup, inherent safety, ease of control, continuous fission product removal, and simple fuel preparation, processing, reprocessing, and handling. Particular advantages of a liquid metal fuel system are high temperature and low pressure operation, fuel radiation damage immunity, no bubble (except fission product gases) formation, and low fuel cost.

To create a heterogeneous, liquid fuel reactor, the problem is that of maintaining a liquid as a fuel element in conjunction with a solid moderator as part of a lattice from which heat is transferred by a second fluid, i.e., a coolant. Encasing the liquid fuel in a solid cladding to create the equivalent of a solid fuel element is unsatisfactory because some circulation of the liquid fuel is necessary to realize the previously described advantages, the neutron flux disadvantage factor is increased with corresponding increase in the critical mass, and liquid fuels are highly corrosive to preferred cladding materials.

A typical example of a liquid metal fuel reactor is a reactor which utilizes a dilute solution of uranium in liquid bismuth. The reactor consists of a moderator core, an optional reflector, and an outer containment vessel. To create the equivalent of cylindrical fuel rods in a lattice, the liquid metal fuel is distributed in the moderator core which is typically a block of graphite or of beryllium that contains a square array of vertical, cylindrical channels up through which the fuel is circulated. Critical mass is determined by the fuel solution concentration, the reflector position, and the size and geometric arrangement of the moderator channels. The core is cooled by circulating a suitable coolant through a separate network of moderator channels.

Liquid metal reactors have inherent disadvantages. A large, expensive, difficult to fabricate moderator core that has precision drilled channels is required. A major problem is that of joining the moderator core to the upper outlet and lower inlet header with a bond which has adequate mechanical strength and corrosion resistance, to thermal cycling, and to radiation damage. Preferred moderator core construction materials are beryllium which is expensive and difficult to work and graphite which is ill suited to withstand liquid metal pore penetration and flow erosion at high temperature. The requirement that the fuel circulate through enclosed channels is another disadvantage because unusually high power is necessary to pump liquid metal fuels. The moderator core material that separates fuel from coolant is an undesirable heat transfer barrier which comprises core design. Because of inadequate high temperature corrosion resistance of materials possessing satisfactory mechanical properties, existing liquid fuel reactors are restricted to operate at temperatures for which the solubility of fissile materials in liquid metals is low, with concomitant increase in critical mass.

The object of the present invention is to eliminate or minimize the disadvantages of liquid fuel reactors through the novel employment of capillary fuel elements created by the method of confining the liquid fuel in a horizontal capillary trough the distance across which approximately equals twice the liquid fuel capillary constant and to which the liquid is nonadhesive so that a a meniscus of the liquid fuel projects above the trough edge. Because the liquid is nonadhesive to the capillary trough, interfacial tension attracts the liquid inward and prevents the liquid from flowing over the trough edge. Thus, a liquid fuel volume with circular cross section is created along with a proportionally large liquid fuel surface, half of which is unenclosed above the trough edge. And, because the horizontal capillary is, as defined, approximately horizontal, i.e., slightly inclined, the liquid fuel will flow through it under the force of gravity. The combination of the capillary trough filled with liquid fuel is the capillary fuel element of the invention, and it is equivalent to a solid fuel element, half the longitudinal surface of which is cladded with capillary trough construction material.

An advantage of the present invention is that it is easier to fabricate capillary troughs into materials than to drill the required long precision channels into the core materials of present liquid fuel reactors and that no bonding is necessary at the outlet end of the capillary. Another advantage of the present invention is that the liquid fuel, relative to its volume, has a large surface area, half of which directly interfaces with core coolant, which enhances heat transfer relative to present liquid fuel reactors in which moderator material is a thermal barrier between fuel and coolant. Thus high specific power and the utilization of gaseous coolant are practical. A third advantage is that the fuel element can be conveniently shaped into various geometric forms along its longitudinal axis; thus greater flexibility of core design and fuel circulation patterns are possible, e.g., a single long fuel element can be wound helically to form a cylindrical shape core. A fourth advantage is that the liquid fuel is unenclosed in the capillary fuel element, and, consequently, encounters considerably less flow resistance than when enclosed in the moderator channels of present liquid fuel reactors. Thus, the pumping power required to circulate the fuel is considerably reduced, and when the element is slightly inclined, the fuel flows under gravity at a rate slow enough for reactor operations.

A fifth advantage of the invention is that fuel pore penetration and flow corrosion of the trough construction material is reduced because the unenclosed fuel exerts no hydrostatic pressure on the capillary trough. A sixth advantage is the larger number of suitable materials for capillary fuel element construction than for the construction of present liquid fuel reactor cores. Materials which have unsatisfactory mechanical properties for the construction of present liquid fuel reactors, yet which have attractive neutron absorption, radiation, and high temperature properties, can be utilized in the construction of the invention, e.g., sintered beryllium oxide, aluminum oxide, thorium oxide, ceramics, and cermets. As a consequence, the invention can be constructed to operate at higher temperatures than present liquid fuel reactors so as to realize greater thermodynamic efficiency and increased fissile material solubility in the liquid fuel, accompanied by decreased critical mass. A seventh advantage of the invention is that no gaseous fission product, e.g., xenon-135, holdup can exist in the unenclosed fuel as in the enclosed fuel channels of present liquid fuel reactors.

According to the invention, a suitable liquid fuel is any homogeneous liquid which contains a suitable quantity of a fissile substance and which is nonadhesive to the capillary trough construction material. Examples of suitable liquid metal fuels are liquid plutonium, solutions of uranium in liquid bismuth, in bismuth and lead, or in aluminum and solutions of plutonium in liquid iron, bismuth, magnesium, aluminum, cobalt, or nickel. Examples of molten salt fuels are solutions of uranium tetrafluoride in beryllium fluoride, zirconium fluoride and either lithium-7 fluoride or sodium fluoride. A suitable material for the construction of the capillary trough of the liquid fuel element is any substance which is nonadhesive to the liquid fuel, which has suitable neutron absorption properties, and which can withstand the temperature, pressure, chemical, and radiation environment during reactor operation. Examples of suitable construction materials, depending upon the type of fuel and reactor operation conditions, are for liquid solutions of bismuth or of bismuth and lead: beryllium, sintered beryllium oxide, chromium-molybdenum steels; for liquid solutions of bismuth, aluminum, iron, magnesium, cobalt, or nickel: graphite, ceramics, cermets; and for solutions of molten salts: graphite, nickel base alloys, copper base alloys, ceramics, and cermets.

In accordance with this invention, a flat fuel component is constructed by attaching the longitudinal edges of capillary fuel elements to a flat, vertical support plate so as to form an array of slightly inclined, closely spaced parallel horizontal rows. A cylindrical fuel component is constructed by attaching the capillary fuel elements in parallel helices around a hollow, support cylinder. Alternatively, the support comprises a series of suitable parallel, vertical, rigid rods attached at intervals to the longitudinal sides of the capillary fuel elements arranged in parallel horizontal rows or helices so as to form a rigid grate-like structure. An advantage of the fuel components, according to the invention, is the large effective length of the fuel element and the extremely low space requirement; inasmuch as the long dimension of the fuel element is essentially either folded on to a thin flat plate or wrapped around a vertical cylinder of small volume According to the invention, suitable construction material for capillary fuel element support are the same as those materials used for the construction of capillary fuel elements. Preferred materials are neutron moderator substances, e.g., graphite, beryllium, or beryllium oxide. Suitable means of attaching the capillary fuel element to a support structure are by fusing, by welding, or bradding. Alternatively, the capillary fuel elements are cast, molded, extruded, or milled into the construction material so as to form an integral unit.

In the present invention, a reactor core is created by arranging the fuel and neutron moderator components in a suitable geometric and spatial pattern to form a critical mass. In conjunction with a flat fuel component the moderator component is a thin flat slab of moderator material, situated alternately and parallel to the fuel components. In conjunction with a cylindrical fuel component, the moderator component is a hollow cylinder of moderator material, situated alternately and concentrically to the fuel component. Alternatively, when the fuel component is constructed of suitable neutron moderator material, the fuel components are situated alternately and parallel to each other, without the incorporation of separate moderator components. Sufficient separation is maintained between the components to create suitable channels for coolant circulation.

A suitable coolant is any liquid or gas that is inert to reactor materials to which it interfaces, that has suitable thermodynamic, heat transfer, and neutron absorption properties, and that can withstand the temperature, pressure, chemical and radiation environment of the reactor. Suitable gaseous coolants are inert gases (helium, neon, argon, krypton, and xenon), low molecular weight aliphatic hydrocarbons (methane, ethan, and propane), carbon dioxide, and nitrogen. Suitable liquid coolants are high boiling point organic liquids (polyphenylls: biphenyl, isopropylbiphenyl, mixtures of metaphenyl, orthoterphenyl, and paraterphenyl), liquid alkali metals, and alkali metal alloys.

In the present invention, the nuclear reactor consists of a vessel that encloses a core surrounded on all sides by a suitable neutron reflector, a fuel reservoir located above the core, suitable means to control and distribute fuel to the fuel elements in the core, a fuel reservoir located below the core, and suitable means to return fuel from the lower to the upper fuel reservoir. During operation, fuel flows under gravity from the upper fuel reservoir and is distributed to flow through the fuel elements. A suitable means for distributing the fuel to the fuel elements is a conventional pipe manifold. Heat is generated in the core by the critical mass maintained by the combination of moderator material and liquid fuel. The fuel flows through the fuel elements at a rate predetermined by the inclination of the fuel element from horizontal and into the lower fuel reservoir from where a suitable pump returns it through a conduit to the upper fuel reservoir. Heat is removed from the core to an external heat exchanger by a coolant circulated through the vessel enclosing the core. Alternatively, the pump is omitted, and fuel is returned to the upper fuel reservoir through the conduit by the pressure of a gaseous coolant in the vessel enclosing the core.

By way of example, embodiments according to the invention are shown diagrammatically in the accompanying FIGS. 1–3.

Figure 1:
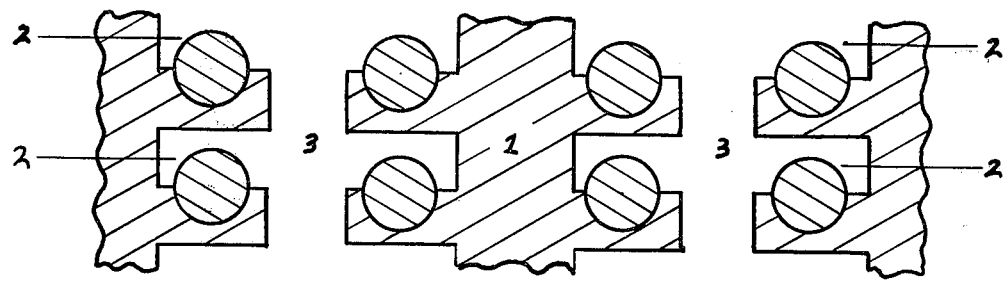
FIG. 1 is a magnified cross section of a typical core comprised of fuel components constructed as an integral unit from moderator material and arranged so as to create channels for coolant circulation.

More particularly, FIG. 1 illustrates a typical cross section normal to the longitudinal axes of the capillary fuel elements comprising the fuel components which are constructed as integral units from moderator material and are arranged to form channels for coolant circulation. 1 is the fuel component which contains horizontal capillary troughs, slightly inclined to vertical, which are nonadhesive to the fuel and which have longitudinal openings that approximately equal twice the capillary constant of the fuel at the environment of the core. 2 is the liquid fuel which flows under gravity through the capillary troughs and which forms a meniscus that has an approximately circular cross section and projects above the trough edge. The combination of moderator construction material and fuel forms a critical mass which generates heat through a nuclear chain reaction. Heat is removed from the core by a coolant which circulates through the channel 3.

Figure 2:
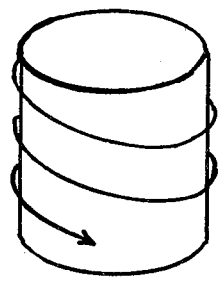
FIG. 2 is a perspective of a cylindrical fuel component and shows, in exaggeration, the fuel flow direction.

FIG. 2 shows, in exaggeration, the helical flow direction of fuel through a fuel element of a cylindrical fuel component. Fuel is fed to the trough from an upper fuel reservoir and flows at a rate predetermined by the pitch of the fuel element helix down to the lower fuel reservoir.

Figure 3:
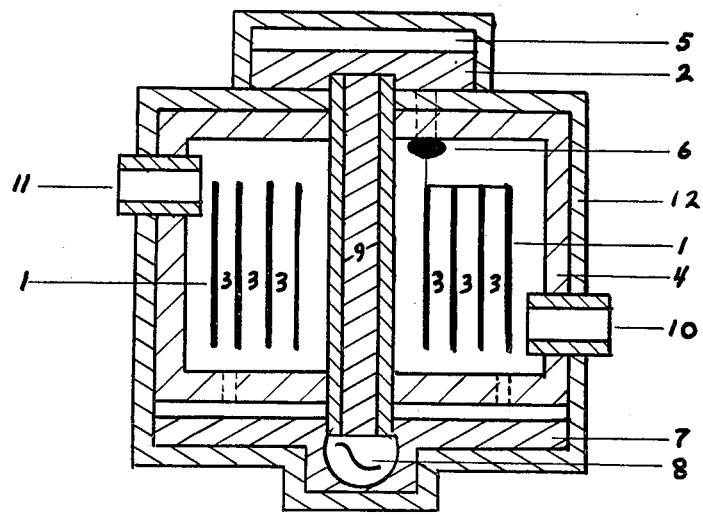
FIG. 3 is a longitudinal cross section of a reactor embodiment which utilizes cylindrical fuel components constructed as integral units from moderator material, a gaseous coolant, and fuel return by means of a mechanical pump.

FIG. 3 is a longitudinal cross section through a cylindrical reactor. Cylindrical fuel components 1, constructed as integral units from moderator material are arranged concentrically to form a core with coolant channels 3. The core is surrounded by a neutron reflector 4. Fuel 2 from the upper fuel reservoir 5 is distributed through the distribution means 6 to the fuel components 1 through which it flows into the lower fuel reservoir 7 from where a pump 8 returns it through conduit 9, which is the inner surface of the center fuel component, to the upper fuel reservoir. Coolant is admitted through inlet 10, circulates through the core channels 3 and exists through outlet 11. The core is surrounded by a neutron reflector 4 and is enclosed in containment vessel 12. Because the reactor has a negative temperature coefficient, it will tend to operate at the same average moderator temperature at all power levels. This temperature is maintained by controlling the uranium fuel concentration.

A more particular example is a cylindrical reactor, illustrated by FIG. 3, which employs 4.6 percent enriched uranium dissolved in molten bismuth to form a 8.5 percent solution as fuel at an average 850° C. (1560° F.) temperature. The fuel capillary constant at 850° C. is 0.28 cm (0.11 in). The fuel component 1, a magnified cross section of which is illustrated by FIG. 1, are 25 concentric, 2.8 cm (1.1 in) thick, 180 cm (70.9 in) high, graphite cylinders constructed as an integral unit of capillary troughs and moderator material. The distance between the cylinders, i.e., the coolant channel 3 width, is 0.75 cm (0.30 in); and the width of the cylinder lips which contain the fuel 2, is 0.90 cm (0.35 in). There are 183 equally spaced lips per vertical surface of a cylinder. The outside radius of the outermost cylinder is 90 cm (35.4 in), and the inside radius of the innermost cylinder is 5.0 cm (2.0 in). The neutron reflector 4, constructed of graphite, is 30 cm (11.8 in) thick. The coolant is methane at 134 atmospheres (2000 psi) pressure.

The physical parameters of the bare example reactor have been determined to be as follows:

Regeneration factor ($\eta$) 1.89
Thermal utilization factor (f): 0.980
Infinite multiplication factor ($k_\infty$): 1.85
Diffusion area (corrected for coolant channel voids) ($L^2$): 156.9 cm$^2$
Neutron age ($\tau$): 486 cm$^2$
Geometric buckling factor ($B^2$): 0.00098/cm$^2$
Critical mass: 28.6 kg (62.9 lb) uranium-253 dissolved in 5883 kg (12,943 lb) of molten bismuth.

The operating characteristics of the example reactor are as follows:

Core thermal power: 50 Mw
Neutron energy: thermal
Fuel (clean): 3900 ppm uranium-235 in molten bismuth; 8.5 at. % of 4.6% enriched uranium in molten bismuth.
Fuel capillary constant: 0.28 cm (0.11 in) at 850° C. (1560° F.)
Moderator: graphite (1.9 gm/cm$^3$) as an integral part of fuel component.
Coolant: Methane at 134 atm (2000 psi)
Core height: 180 cm (70.9 in)
Core radius: 90 cm (35.4 in)
Total number of fuel components: 25 concentric cylinders
Total number of capillary troughs per cylinder vertical surface: 183 equally spaced.
Coolant channel width (distance between cylinder surfaces): 0.75 cm (1.90 in)
Fuel volume: 0.65 m$^3$ (22.9 ft$^3$)
Moderator volume: 2.15 m$^3$ (75.7 ft$^3$)
Coolant (void) volume: 1.78 m$^3$ (62.7 ft$^3$)
Fuel volume fraction: 14.7%
Moderator volume fraction: 46.8%
Coolant volume fraction: 38.9%
Maximum fuel temperature: 1100° C. (2012° F.)
Maximum moderator temperature: 1000° C. (1832° F.)
Coolant inlet temperature: 600° C. (1112° F.)
Coolant outlet temperature: 900° C. (1652° F.)
Coolant flow rate: 129,102 kg/hr (284,024 lb/hr)
Coolant core channel velocity: 2.7 m/sec (9.0 ft/sec)
Coolant flow frontal area: 0.52 m$^2$ (5.8 ft$^2$)
Total heat transfer surface: 821 m$^2$ (8834 ft$^2$)

Although the invention had been described with a certain degree of particularity, especially in the use of a nuclear reactor that utilizes fuel components which are constructed as integral units from moderator materials, it is to be understood that the present disclosure is made by way of example and illustration only and that numerous changes in application, in construction details, and in the arrangement and combination of parts may be made without departing from the spirit and scope of the invention hereinafter claimed.

I claim as my invention:

1. A nuclear reactor core comprised of a number of moderator components and fuel components wherein said fuel component is comprised of capillary fuel elements created by the method of confining a liquid fuel in a horizontal capillary trough to which said liquid fuel is nonadhesive so that a meniscus of said liquid fuel projects above said capillary trough edge, and said capillary fuel elements are arranged in a geometric and spatial pattern with support to form said fuel components; said fuel components are arranged in a geometric and spatial pattern in relationship to said moderator components with sufficient separation maintained between said components to create channels for a coolant to circulate therein; and the combination of said moderator components, said coolant, and said fuel components comprises a critical mass.

2. A reactor core as claimed in 1, wherein said capillary fuel elements and said support are a single integral unit.

3. A reactor core as claimed in 1, wherein said capillary fuel elements, said support, and said moderator component are single integral unit.

4. A nuclear reactor comprised of a core as claimed in 1, a vessel that encloses said core and a neutron reflector that surrounds said core, an upper fuel reservoir located above said core, means to control and distribute fuel from said upper fuel reservoir to the inlets of the fuel elements in said core, a lower fuel reservoir below said core into which said fuel flows from said fuel elements, means to return fuel from said lower to said upper reservoir, and inlets and outlets for coolant in said vessel enclosing said core.

* * * * *